United States Patent [19]

Sullivan

[11] Patent Number: 4,885,636
[45] Date of Patent: Dec. 5, 1989

[54] BLOCK ADAPTIVE LINEAR PREDICTIVE CODING WITH ADAPTIVE GAIN AND BIAS

[75] Inventor: James R. Sullivan, Spencerport, N.Y.

[73] Assignee: Eastman Kodak Company, Rochester, N.Y.

[21] Appl. No.: 232,258

[22] Filed: Aug. 15, 1988

Related U.S. Application Data

[63] Continuation-in-part of Ser. No. 132,080, Dec. 10, 1987, which is a continuation of Ser. No. 65,230, Jun. 22, 1987, abandoned.

[51] Int. Cl.$^4$ .............................................. H04N 7/137
[52] U.S. Cl. ..................................... 358/133; 358/135
[58] Field of Search ........................ 358/133, 135, 136

[56] References Cited

U.S. PATENT DOCUMENTS

4,704,628 11/1987 Chen .................................... 358/136

Primary Examiner—Howard W. Britton
Attorney, Agent, or Firm—Thomas H. Close

[57] ABSTRACT

A block adaptive linear predictive coding method for encoding a digital image is improved by calculating the mean of the error signals in each block, and selecting a quantizer for each block, using the calculated signal and the calculated mean, from a set of minimum square error two-variable quantizers.

18 Claims, 9 Drawing Sheets

FIG. 1a

FIG. 1b $$\cdots \quad \tilde{x}_{p-1,\ell-1} \quad \tilde{x}_{p,\ell-1} \quad \tilde{x}_{p+1,\ell-1} \quad \cdots$$

$$\cdots \quad \tilde{x}_{p-1,\ell} \quad 0 \quad \cdots$$

$$\hat{x}_{p,\ell} = a_0 \, \tilde{x}_{p-1,\ell} + a_1 \, \tilde{x}_{p-1,\ell-1} + a_2 \, \tilde{x}_{p,\ell-1} + a_3 \, \tilde{x}_{p+1,\ell-1}$$

BLOCK ADAPTIVE LINEAR PREDICTIVE CODING WITH ADAPTIVE GAIN AND BIAS

This is a Continuation-in-Part of U.S. Ser. No. 132,080 filed December 10, 1987 which is a Continuation-in-Part of U.S. Ser. No. 065,230 filed June 22, 1987 now abandoned.

A portion of the disclosure of this patent document contains material to which a claim of copyright protection is made. The copyright owner has no objection to the copying of the patent document or the patent disclosure, but reserves all other rights.

TECHNICAL FIELD

The present invention relates to the field of digital image processing and more particularly to a method for compressing a digital image signal by block adaptive linear predictive coding.

BACKGROUND ART

Image compression is an essential element of many digital imaging systems due to the vast amount of information contained in a digitized image. Because of its simplicity, compression efficiency and ease of implementation, linear predictive coding (LPC) is often used to compress image data for storage and transmission. LPC refers to the general class of coding techniques in which the difference or error between a given signal value and a linear prediction of the signal value, based on correlated signal values, is coded. The advantage of coding the error signal is that it is less correlated, has lower variance, and is more stationary than the original signal, which make it easier to compress.

Depending on the type of image and the level of adaptability to variations in image structure, compression ratios of from 2:1 to 6:1 have been achieved. Both adaptive prediction (see, for example, "DPCM Picture Coding with Adaptive Prediction" by Zschunke, IEEE Transaction on Communications, Vol. Com-25, November, 1977, pages 1295-1302), and adaptive quantization (see, for example, "Adaptive Predictive Coding with Applications to Radiographs" by M. Rabani, L. A. Ray, and J. Sullivan, Medical Instrumentation, Vol. 20, No. 4, July-August, 1986, pages 182-191) have been examined, with most of the emphasis being placed on adaptive quantization due to its superior performance for a given hardware implementation complexity.

The predominant adaptive quantization technique is termed block-adaptive wherein a quantizer is selected from a finite set of quantizers to encode a linear block of error signals based on the statistics of independent linear blocks. A number of empirical studies have been conducted to establish the best set of quantizers (see, for example, "On the Design of Quantizers for DPCM Coders: A Functional Relationship Between Visibility, Probability, and Masking" by J. O. Limb and C. B. Rubinstein, IEEE Transactions on Communications Techniques, COM-26, 1978, pages 573-578). All of these studies have concerned variations in the quantizer range or gain based on the block-to-block variations of the error signal sigma value assuming that the error signal is zero-mean. It is an object of the present invention to provide a new block adaptive LPC technique that improves the compression ratio over the aforementioned gain adaptive techniques for a given image fidelity for all classes of images of interest to a human observer, thereby reducing storage requirements and/or transmission times.

SUMMARY OF THE INVENTION

According to one aspect of the present invention, the object is achieved by taking into account the block-to-block variations of the centroid (preferrably mean) of the error signal from zero as well as the block-to-block variations of the range (preferrably sigma value) of the error signal, and adapting to these variations by selecting from a set of two-variable quantizers optimally designed to minimize the square difference between the input error signal and the coded error signal.

Excluding the first pixel in each image line and the first line of pixels (which are directly quantized) the error signal is formed for a given pixel by making a prediction of the pixel value from previously coded error signals that are in close proximity to the pixel value in two dimensions, and subtracting the prediction from the pixel value. The error signals in a linear block are then quantized by selecting from a set of two-variable quantizers designed for the class of images to which the current image belongs, by performing the following steps: (1) forming independent linear blocks of error signals; (2) forming maximum likelihood (ML) estimates for a function of the mean and sigma value of the error signals in a block; (3) from the minimum square error decision regions of the mean and sigma values for the class of images, determining which two-variable decision region contains the ML estimates; (4) using the minimum square error reconstruction values for sigma (gain) and mean (bias) from the selected region to construct the minimum square error quantizer for the error signal in the block; (5) quantizing the error signal in the block employing the constructed quantizer; (6) transmitting or storing the quantized (coded) error signal and a code word for the selected quantizer; and (7) proceeding to the next block and repeating the steps (1)-(6) until the line of image signals is processed.

According to another aspect of the present invention, the object is achieved by identifying runs of blocks having low contrast, and encoding these blocks with a flag indicating a run, and a value indicating the number of blocks in the run. According to a further aspect of the present invention, the object is achieved by providing quantizers having different numbers of quantization levels based on the value of sigma, higher values of sigma having more quantization levels.

MODES OF CARRYING OUT THE INVENTION

Before describing the method of the present invention in detail, the derivation of the mean and sigma ML estimates for a Laplacian signal and the derivation of the minimum square error set of quantizers will be described.

Figure 2:
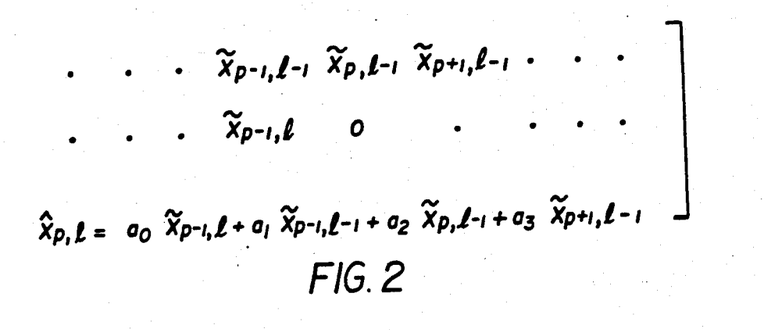
FIG. 2 is a graph showing the pixels included in a typical two-dimensional linear predictor, and the prediction equation.

The most commonly employed model for probability density function (pdf) of the error signal formed by subtracting from an input pixel value the linear combination of reconstructed pixel values as illustrated in FIG. 2 is a Laplacian (see "Digital Image Processing" by W. K. Pratt, page 653, John Wiley & Sons, 1978) which for a non-zero mean signal is given by $$p(\Delta) = \frac{1}{\sqrt{2} \cdot \sigma} \exp{-\sqrt{2} \frac{|\Delta - \mu|}{\sigma}}. \quad (1)$$

Figure 3:
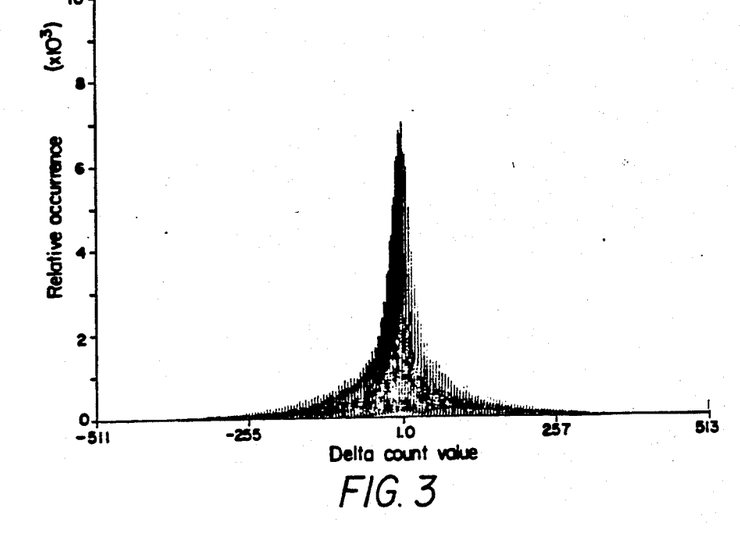
FIG. 3 is a graph showing a typical error signal histogram illustrating the peaked, Laplacian-like nature of the error signal.
Figure 4:
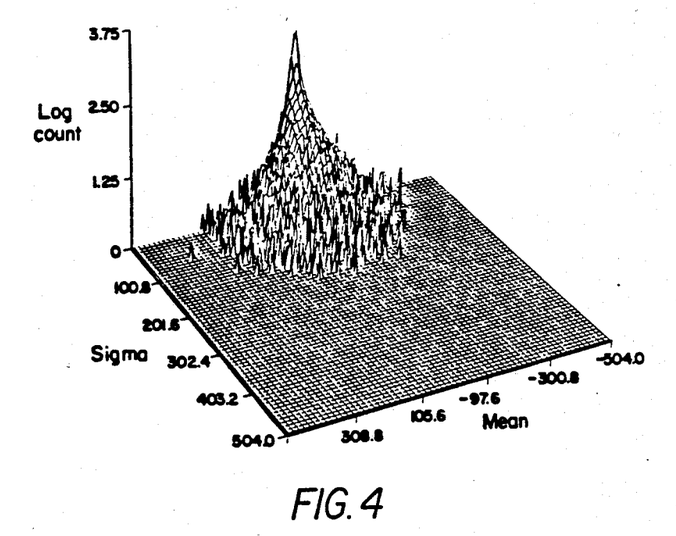
FIG. 4 is a graph showing a typical joint histogram of the ML estimates for the Laplacian mean and sigma in independent image blocks.

FIG. 3 shows a full image error signal histogram that is well fit by this model with $\mu = 0$. Locally, in small image blocks, this zero-mean model breaks down, as illustrated in FIG. 4 which shows the joint histogram of the maximum likelihood (ML) estimates for the Laplacian mean and sigma values of a typical image in five pixel linear blocks. The method of maximum likelihood moment estimation which can be found in many textbooks on mathematical statistics such as "An Introduction to Mathematical Statistics" by R. J. Larsen and M. L. Max, Prentice Hall, Inc., Englewood Cliffs, N.J., 1981, gives for the ML estimates.

$$\sigma = \frac{\sqrt{2}}{N} \sum_{i=1}^{N} |\Delta(i) - \mu|, \quad (2)$$

$$\mu = \text{median}\{\Delta(i), i = 1, N\}, N = 5.$$

FIG. 4 shows that the variations in mean are as significant as the variations in sigma. To optimally adapt to these variations it is necessary to select a set of quantizers that minimizes the total error introduced by the non-stationarity of the differential signal, i.e. variations in $\mu$ and $\sigma$, as well as the variations in $\Delta$ given $\mu$ and $\sigma$. For a normalized, i.e. unit variance, reconstruction level r; based on estimates $\mu_m$, $\sigma_n$ of the true Laplacian moments $\mu$, $\sigma$ in a given image block the square error is given by:

$$[(\sigma_n r + \mu_m) - (\sigma \Delta + \mu)]^2. \quad (3)$$

The total square error for normalized decision levels d; and the moment decision levels $q_m$ and $t_n$ are given by:

$$\epsilon^2 = \sum_m \sum_n \sum_j \int_{q_m}^{q_{m+1}} \int_{t_n}^{t_{n+1}} \int_{d_j}^{d_{j+1}} \quad (4)$$

$$[(\sigma_n r_j - \sigma \Delta) + (\mu_m - \mu)]^2 p(\Delta, \mu, \sigma) d\Delta d\sigma d\mu.$$

To optimize the quantization, it is necessary to minimize this error with respect to $q_m$, $t_n$, $d_j$, $\mu_m$, $\sigma_n$, and $r_j$. In a given stationary image block defined by $\mu$, $\sigma$ and estimates $\mu_m$, $\sigma_n$ the minimum error decision and reconstruction levels are given by $$d_j = \frac{\sigma_n}{\sigma} \left( \frac{r_j + r_{j-1}}{2} \right) + \frac{\mu_m - \mu}{\sigma}, \quad (5)$$

$$r_j = \frac{\sigma}{\sigma_n} \left( \frac{\int_{d_j}^{d_{j+1}} \Delta p(\Delta|\mu,\sigma) d\Delta}{\int_{d_j}^{d_{j+1}} p(\Delta|\mu,\sigma) d\Delta} \right) - \frac{\mu_m - \mu}{\sigma}.$$

The values of $\mu$ and $\sigma$ are not known exactly and can only be estimated by the quantized values $\mu_m$, $\sigma_n$. Substitution of $\mu_m$ and $\sigma_n$ for $\mu$ and $\sigma$ gives for the decision and reconstruction levels $$d_j = \frac{r_j + r_{j-1}}{2}, \quad (6)$$

$$r_j = \frac{\int_{d_j}^{d_{j+1}} \Delta p(\Delta|\mu_m,\sigma_n) d\Delta}{\int_{d_j}^{d_{j+1}} p(\Delta|\mu_m,\sigma_n) d\Delta}.$$

Using these in the error minimizations for $\mu_m$, $\sigma_n$, $q_m$, $t_n$ gives $$q_m = \frac{\mu_m + \mu_{m-1}}{2}, \quad (7)$$

$$\mu_m = \frac{\int_\sigma \int_{q_m}^{q_{m+1}} \mu p(\mu,\sigma) d\mu d\sigma}{\int_\sigma \int_{q_m}^{q_{m+1}} p(\mu,\sigma) d\mu d\sigma},$$

$$t_n = \frac{\sigma_n + \sigma_{n-1}}{2},$$

$$\sigma_n = \frac{\int_\mu \int_{t_n}^{t_{n+1}} \sigma p(\mu,\sigma) d\mu d\sigma}{\int_\mu \int_{t_n}^{t_{n+1}} p(\mu,\sigma) d\mu d\sigma},$$

Assuming that $\mu$ and $\sigma$ are independent for the sake of simplicity, the reconstruction equations reduce to $$\mu_m = \frac{\int_{q_m}^{q_{m+1}} \mu p(\mu) d\mu}{\int_{q_m}^{q_{m+1}} p(\mu) d\mu}, \quad (8)$$

$$\sigma_n = \frac{\int_{t_n}^{t_{n+1}} \sigma p(\sigma) d\sigma}{\int_{t_n}^{t_{n+1}} p(\sigma) d\sigma}.$$

Figure 5:
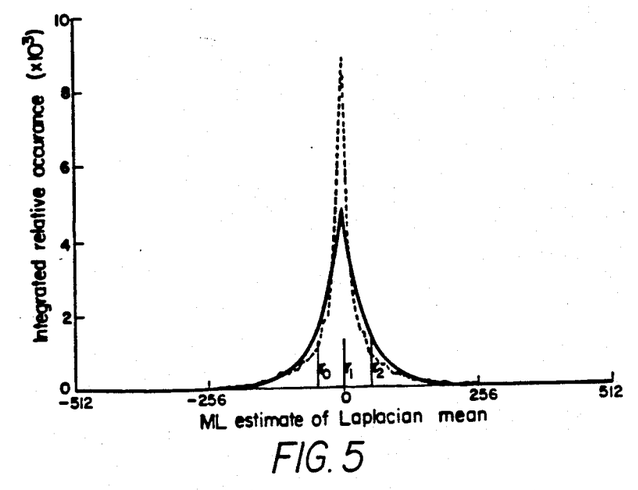
FIG. 5 is a graph showing the marginal histogram of the ML estimate for the Laplacian mean in independent image blocks.
Figure 6:
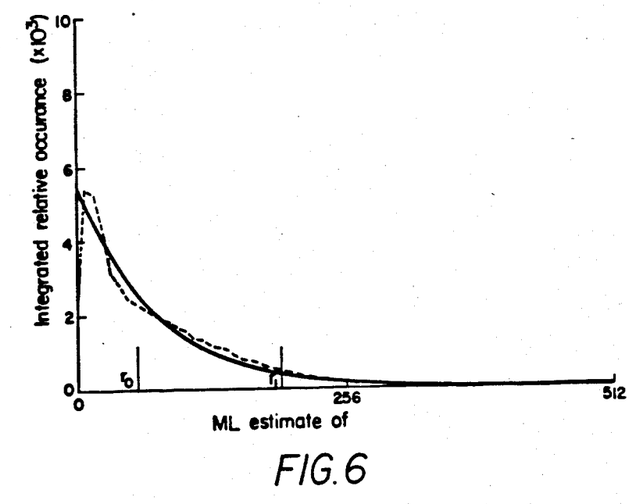
FIG. 6 is a graph showing the marginal histogram of the ML estimate for the Laplacian sigma in independent image blocks.
Figure 7:
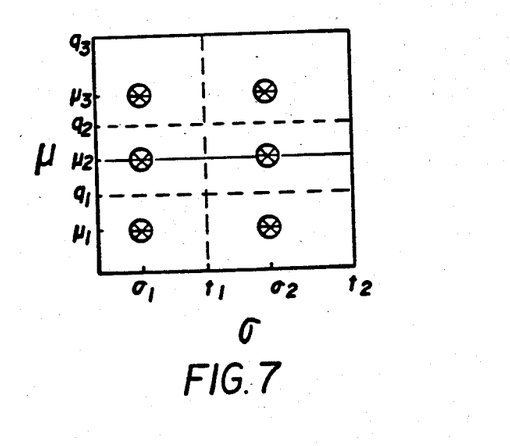
FIG. 7 is a graph illustrating the quantizer selection for the three-bias, two-gain block adaptive quantizer.

To use the reconstruction equations (8) and the equations for $q_m$ and $t_n$ in equations (7) to construct the set of minimum square error quantizer models for mean and sigma pdf's, $p(\mu)$ and $p(\sigma)$ must be selected. FIGS. 5 and 6 show marginal histograms (dashed curves) for the block mean and the block sigma values for a typical image, the Laplacian (mean) and exponential (sigma) models used to represent them, and the reconstruction levels from equations (8) (solid curves) for a three-bias, two-gain quantizer. The decision levels from equations (7) lie halfway between the reconstruction levels. This three-by-two quantizer is illustrated in FIG. 7, where the dashed lines represent the decision regions and the ⊙ is the optimal two-variable quantizer in each region.

Figure 1A:
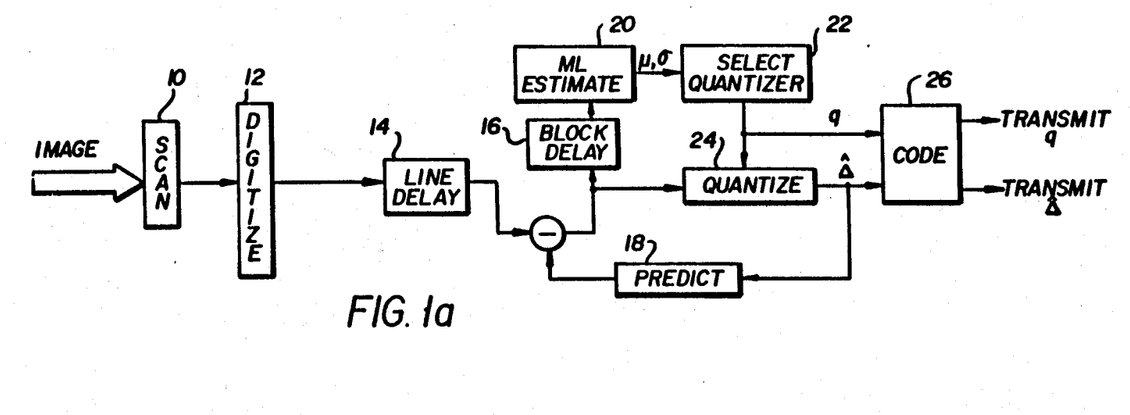
FIGS. 1a and 1b are block diagrams of a compressor and expander, respectively for practicing the image signal processing method according to the present invention.

Referring now to FIG. 1a, a generic image processing apparatus employing the block adaptive gain and bias linear predictive coding technique according to the present invention will be described. An image or scene is sampled by a scanning apparatus 10, such as a video scanner or graphic arts scanner. The sampled image is digitized by an analog-to-digital converter 12 and the digitized sampled image is input into the compressor where it is delayed one line (14) and the length of one block (16) along the current line. Predictions are made (18) for the pixel values in each block using the previous coded pixel values on the line and coded pixel values on the previous line. These predictions are subtracted from the actual pixel values and the ML estimates (20) for the error signal mean and sigma are calculated in each block according to equations (2). The ML estimates are then used to select (22) the quantizer q (see FIG. 7), and the error signal $\Delta$ is quantized (24) using the selected quantizer, with all error signals in the block in decision region j being replaced by reconstruction levels $r_j$. The quantized error signal $\hat{\Delta}$ is fed back for subsequent predictions (18) and coded (26) along with the selected quantizer q by a lossless minimum redundancy coding technique such as Huffman coding or run-length coding (see for example "Digital Image Processing" by W. K. Pratt, Chapter 22.3, John Wiley & Sons, 1978). The quantized coded error signal $\hat{\Delta}$ and quantizer q are then transmitted or stored.

Figure 1B:
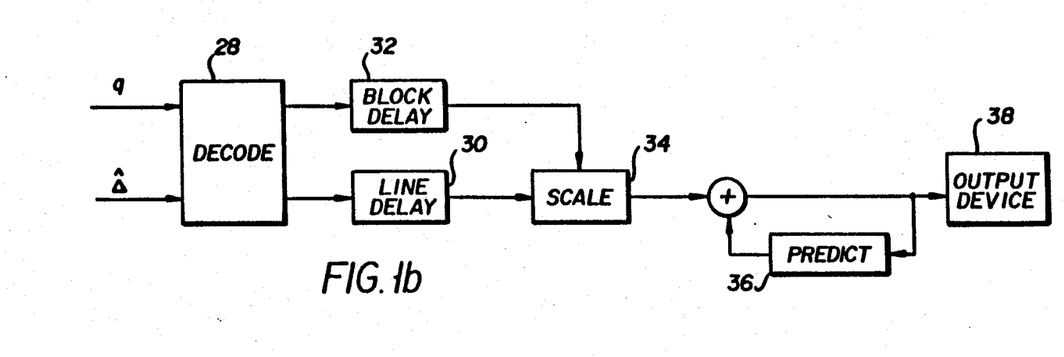

The decompressor accepts the coded values for the selected quantizer q and the quantized error signals $\hat{\Delta}$, decodes (28) the values and performs the inverse process of the compressor by delaying the signal one line (30) and one block (32), scaling the signal (34) according to the selected quantizer and using the previously decompressed pixel values for predicting (36) the pixel value and adding the predicted pixel values to the decoded error signals.

The image compression and decompression apparatus comprise a programmed general purpose computer such as a microprocessor or alternately a custom designed digital signal processing circuit. The decompressed image can be supplied to an output device 38, such as a CRT display or a hardcopy recorder in the event that the image coding was performed to reduce the transmission time or storage requirements of the image. The quantizer selection apparatus (22) includes a memory that contains the quantizer decision and reconstruction levels $q_m$, $\mu_m$, $t_n$, $\sigma_n$.

The predictor apparatus 18 includes a memory that contains the prediction coefficients $a_0$, $a_1$, $a_2$, $a_3$ for forming the linear prediction. The quantizer apparatus 24 includes a memory that contains Max quantizer decision and reconstruction values for a zero-mean, unit variance Laplacian signal. See for example, "Digital Image Processing" by W. K. Pratt, Table 6.1-1, page 144, John Wiley & Sons, 1978.

Figure 8A:
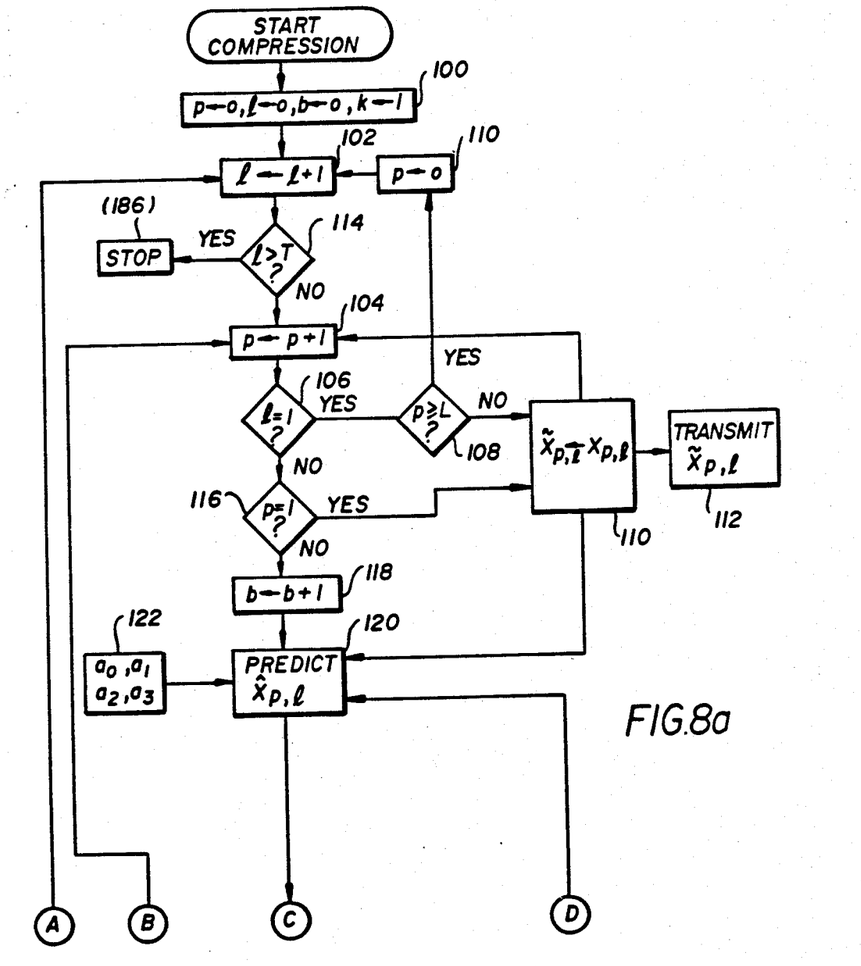
FIGS. 8a and 8b are flow charts illustrating the compressor for a block adaptive gain and bias linear predictive coding technique according to the present invention.
Figure 8B:
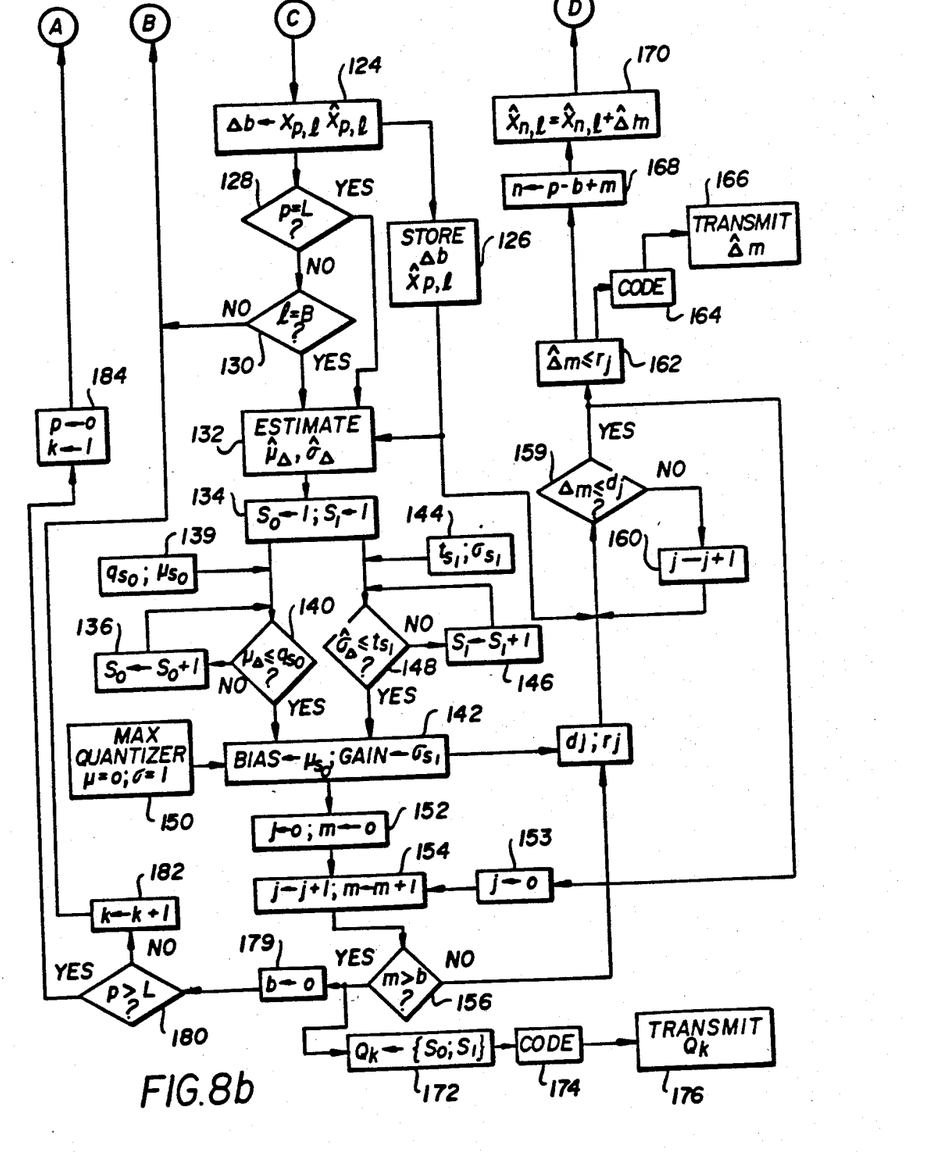

The compressor for the block adaptive gain and bias linear predictive coding technique by programming a microprocessor will now be described with reference to the flow charts shown in FIGS. 8a and 8b. It will be obvious to one skilled in the art how to program the microprocessor from the following description. The following description assumes that the image signal is presented to the compressor in a linear raster scan. At the start of scan, internal counters p for the pixel number, l for the scan line, b for the pixel number in a block, and k for the block number are initialized (100). Counters l and p are incremented by 1 (102, 104) and a check (106) is made for the first line l=1. If true, p is compared (108) with the line length L and if it is less than or equal to L, the pixel value $x_{p,l}$ is assigned (110) to the reconstructed pixel value $\bar{x}_{p,l}$ for future use in prediction and is transmitted (112). The pixel number p is incremented (104) by 1 and the process is repeated until p is greater than l at which point the first line has been transmitted without compression. The pixel number is reinitialized (110) and l and p are incremented by 1. The check for first (106) and last (114) line are false, which is followed by a check (116) for the first pixel, p=1. If true, $x_{p,l}$ is assigned (110) to the reconstructed pixel $\bar{x}_{p,l}$, and transmitted (112). Next p is incremented by 1 (104). If false the block count b is incremented by 1 (118) and a prediction $\hat{x}_{p,l}$ is formed (120) for the current pixel using the prediction coefficients (122) from memory and the reconstructed pixels $\bar{x}_{p,l}$ around the current pixel.

The error signal $\Delta_b$ is calculated (124) and stored (126) in a memory equal to the block size. A check is made (128) for the last pixel in a line. If false, p and b are incremented by 1 (104, 118), new prediction and error signals are calculated (120, 124), and the error signal is stored (126) until b=B (130) at which time the error signal memory contains one block.

ML estimates for the mean error $\hat{\mu}_\Delta$ and sigma error $\hat{\sigma}_\Delta$ are then made (132) in the block. If p=L (128), the error signals accumulated in the memory (126) to that point are used to estimate the mean and sigma error values. These estimates are then used to select the quantizer as follows. The two variable quantizer counters $s_0$ and $s_1$ are initialized (134). The mean estimate $\hat{\mu}_\Delta$ is incrementally (136) compared with the mean decision levels $q_{s_0}$ stored in ascending order in memory (138) until it is less than a particular level (140) identifying the estimate as contained within that decision region. The reconstruction mean $\mu_{s_0}$ for that decision region then defines the quantizer bias (142). In a like manner, the sigma estimate $\hat{\sigma}_\Delta$ is incrementally compared (144, 146, 148) with the sigma decision levels $t_{s_1}$ until a decision region is identified and the reconstruction $\sigma_{s1}$ for the decision region is selected as the quantizer gain (142). The decision $d_j$ and reconstruction $r_j$ levels for an n-bit zero-mean, unit-sigma Laplacian Max quantizer are recalled from memory (150) and numerically shifted by $\mu_{s0}$ and scaled by $\sigma_{s1}$. The error signal in the block is then quantized by initializing the decision region j and the pixel number m (152). These are then incremented by 1 (154) and a check (156) is made for the end of the block, m>b. If false, the error signal $\Delta_m$ is retrieved from memory (126) and incrementally compared (158, 160) with decision levels $d_j$ arranged in ascending order until it is less than a particular level identifying it as contained within that decision region. The error signal is then replaced by the reconstruction level $r_j$ (162) coded (164) and transmitted (166). The current pixel number number n is calculated (168) and the prediction and quantized error signal $\tilde{\Delta}_m$ are added (170) to obtain the current reconstructed pixel value $\tilde{x}_{n,l}$ which is stored for future predictions. The decision level count j is reinitialized (153), and incremented by 1 along with the block pixel count m (154). If m>b (156) and all the error signals in the current block have been quantized, coded, and transmitted, the selected quantizer for the $k^{th}$ block $Q_k$ (172) is coded (174) and transmitted (176) is overhead. The block count is reinitialized (178) and a check is made (180) for the end of line. If false, block count k is incremented by 1 (182), the pixel value is incremented by 1 (104) and a new block is processed. If true, the pixel value and block count are reinitialized (184), l is incremented by 1 (102) and the next line is processed. This process is continued until the last line T is processed in which case the full image has been transmitted and the compressor stops (186). The decompressor accepts the transmitted signals and performs predictions and addition processes identical to those defined by the reconstruction steps (120, 170) in the flow chart of FIGS. 8a, 8b using the transmitted quantizer (176) for scaling the transmitted $\Delta$ values.

Results of the applying the image compression and decompression method according to the present invention to a 11-bit (i.e. 0-2047) aerial image and an 11-bit portrait will now be discussed. Tables I and II show the root mean square error in 11-bit counts between the original and compressed/decompressed image for the aerial and portrait images respectively for 1-bit non-adaptive LPC, 1-bit gain adaptive LPC, and the 1-bit gain and bias adaptive LPC method of the present invention. For reference, the input sigma values for the image and error image in 11-bit counts are 403 and 112 respectively for the aerial image and 834 and 83 respectively for the portrait. The signal-to-noise improvement for the aerial image is approximately 4 dB, i.e. 93→59 rms noise counts, and for the portrait it is 6 dB, i.e. 109→51 rms noise counts.

TABLE I

| Aerial Image | | |
|---|---|---|
| LPC method | | rms error /11-bit counts |
| non-adaptive | / | 141 |
| gain-adaptive | / | 93 |
| gain and bias adaptive | / | 59 |

TABLE II

| Portrait | | |
|---|---|---|
| LPC method | | rms error /11-bit counts |
| non-adaptive | / | 171 |
| gain-adaptive | / | 109 |
| gain and bias adaptive | / | 51 |

Figure 9:
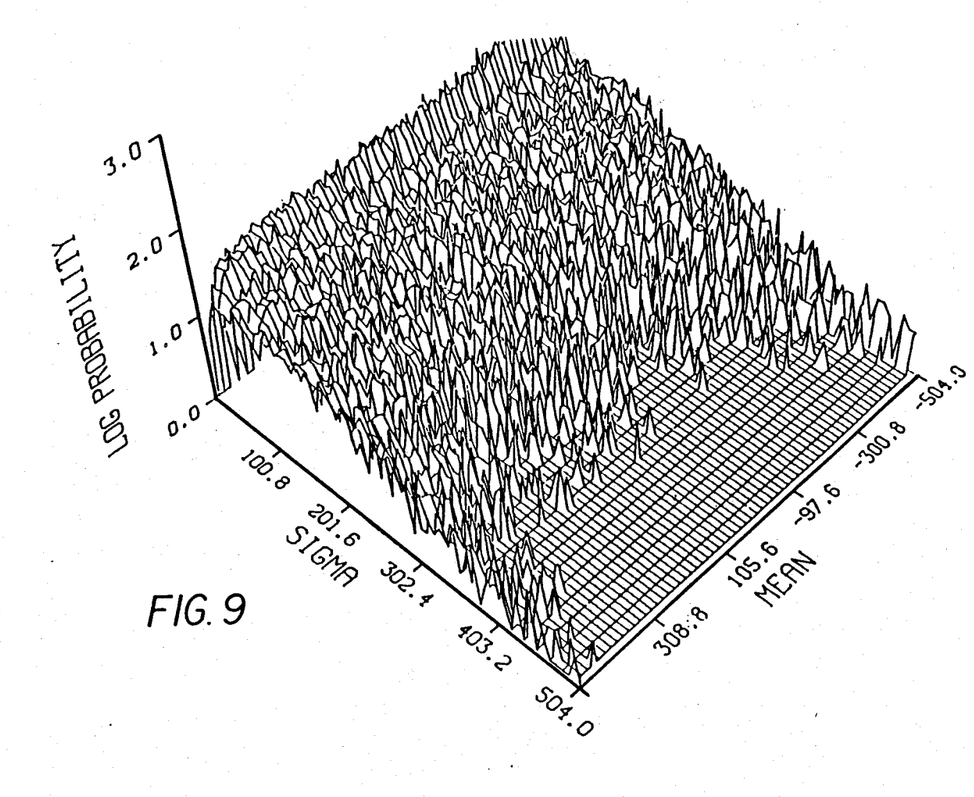
FIG. 9 is a plot of the log probability of sigma and mean in a polar transformed coordinate system.
Figure 10:
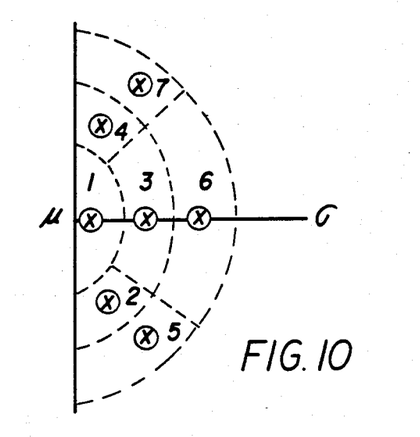
FIG. 10 is a graph showing the quantizer decision and reconstruction values for the polar transformed coordinate system.

Extensions of the present invention will now be discussed. Reference to FIG. 4 shows that the assumption of independence for $\mu$ and $\sigma$ used to simplify equations (8) is not strictly correct. The figure displays a radial symmetry rather than the rectangular symmetry required for independence indicating that the variable defined by $\hat{\mu}^2+\hat{\sigma}^2$, and arctan $(\hat{\sigma}/\hat{\mu})$ are more likely independent variables. A transformation of this form followed by independent scaler quantizations, such as in equations (b 8) can be used to define the decision and reconstruction levels in terms of the transformed variables and an inverse transformation performed on these levels to determine the mean and sigma decision and reconstruction levels. The resultant decision regions will be annular and the reconstruction levels will lie along radial arcs. The transformation of FIG. 4, is shown in FIG. 9, and the resultant quantizer decision and reconstruction values for seven quantizers are shown in FIG. 10. Also to simplify the implementation, the ML estimates for $\hat{\mu}$ and $\hat{\sigma}$ in equation (2) have been replaced by $$\mu = \frac{1}{N} \sum_{i=1}^{N} \Delta(i), N = 5 \qquad (9)$$

and $$\sigma^2 = \frac{1}{N} \sum_{i=1}^{N} \Delta^2(i), N = 5. \qquad (10)$$

Figure 11:
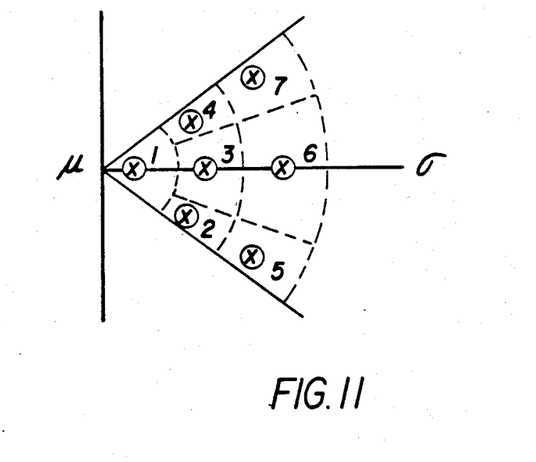
FIG. 11 is a graph showing the quantizer decision and reconstruction values similar to FIG. 10, for a reduced region of support.

In addition to allowing for a parallel estimation of $\hat{\sigma}$ by not subtracting $\hat{\mu}$, equation (10) produces an image quality improvement because it increases the weighting of large $\Delta(i)$ values compared to equation (2) causing larger steps in the quantizers and better rendition of edges. By not subtracting $\hat{\mu}$ the region-of-support of FIG. 10 is reduced as shown in FIG. 11. The new decision regions and reconstruction levels represent a uniform Max quantizer for arctan $(\hat{\sigma}/\hat{\mu})$ and an exponential Max quantizer for $\hat{\mu}^2+\hat{\sigma}^2$.

The mean is employed in equation (9) for simplicity of calculation as the estimator of the centroid, alternatively the median as shown in equation (2) could be employed to estimate the centroid. Other estimators of the centroid including the mode (i.e. the most commonly occurring value) or some function of the mean, median, or mode can also be employed.

Similarly, the standard deviation is employed in equation (10) as an estimate of the range of the error value. Other estimates, such as the average absolute value as shown in equation (2) or a function of the maximum minus the minimum value F(max−min) can also be employed as the estimate of the range.

A second improvement regards the design of the selected quantizes to have a variable number of decision and reconstruction levels. For example, the high or low mean, high sigma value quantizers represent high contrast positively or negatively sloped edges which may require more levels than lower contrast image structures for adequate coding. Increasing the number of levels for these quantizers does not increase the required overhead information but it does cause a variable number of differential signal bits/block. Reference to FIG. 4, however, shows that the total number of bits for the compressed image will not be increased significantly by such a modification because the high or low mean, high sigma value quantizers are not used often in a typical image. For highly detailed graphical images, it has been empirically determined that the low-to-medium contrast (i.e. low-to-medium $\hat{\sigma}$) quantizers, (see decision regions 1-4 in FIG. 11) require 3 levels, and the high contrast quantizers (i.e. high $\hat{\sigma}$) (see decision regions 5-7 in FIG. 11) require 8 levels.

Figure 12:
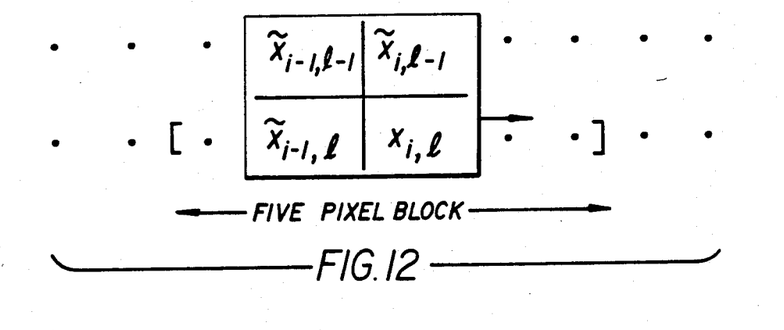
FIG. 12 is a schematic diagram useful in explaining the present invention.

This trend toward fewer levels in low contrast regions have been extended to the limit of no levels for extremely low contrast areas of visually subthreshold modulation. In such areas the output image is defined by a fixed function of the previously reconstructed pixels that requires no pixel information. This is termed a "run" and it is defined by comparing a fixed threshold value with a structure estimate S in a $1 \times N$ image block where S is given by the mean absolute difference between the pixel values in the block and averages of their three nearest reconstructed neighbors. This is shown schematically in FIG. 12. With $i_o$ denoting the first pixel in a block and l the line number, S is $$S = \frac{1}{N} \sum_{i=i_o}^{i_o+N-1} |A_{i,l} - X_{i,l}|, N = 5, \quad (11)$$

where $X_{i,l}$ is an input pixel value, $A_{i,l}$ is given by $$A_{i,l} = \frac{1}{3} [\overline{X}_{i-1,l} + \overline{X}_{i-1,l-1} + \overline{X}_{i,l-1}] \quad (12)$$

and $\widetilde{X}_{i,l}$ is the reconstructed value for the $l^{th}$ line, $i^{th}$ pixel, using $A_{i,l}$ as the reconstruction function within the block. For a fixed threshold T, the block is part of a run if $$S \leq T.$$

The number of contiguous runs times the number of pixels in a block defines the total number of pixels that are reconstructed at the average value $A_{i,l}$. A flag bit indicates that a run is beginning and the length of the run, in blocks, is transmitted in the next k bits. It has been empirically determined that the optimal value for k is 2, which corresponds to a maximum run length of $2^2 \times 5$ or 20 pixels. For the maximum length and a T value of 4, the number of runs in a typical high-quality, continuous-tone image ranges from 30-60% corresponding to an approximate bit-rate reduction of 0.5-1.0 bits/pixel without visible degradation.

To improve the bit-rate without a loss in image quality, Huffman coding and decoding (see, for example, Digital Signal Processing by R. C. Gonzalez and P. Wintz, Addison-Wesley Co., Pages 239-241) has been added for the quantizer, the run length k, and the 3 and 8 level differential signal values. FIG. 4 shows that the low-sigma, zero-mean quantizer is selected a high percentage of the time and therefore it is coded with the fewest bits and the remaining quantizers being coded with a number of bits that is inversely proportional to their usage. For runs it has been determined that long lengths, i.e. 4 blocks, are most probable and therefore assigned the fewest bits with the remaining lengths assigned more bits according to their inverse probabilities. For the 3 and 8 level differential signals the central levels which correspond to the mean reconstruction value are used more often and therefore coded with the fewest bits and the larger differences are coded with more bits. Example Huffman codes are shown in Tables 1, 2, 3, and 4 for the quantizer selection, run length and differential signals respectively.

TABLE 1

Huffman Codes for quantizer selection.

| Quantizer Number (see FIG. 11) | Average Probability | Huffman Code |
|---|---|---|
| 1 | 0.50 | 0 |
| 2 | 0.14 | 001 |
| 4 | 0.14 | 101 |
| 3 | 0.07 | 0011 |
| 5 | 0.06 | 1011 |
| 7 | 0.06 | 0111 |
| 6 | 0.03 | 1111 |

TABLE 2

Huffman codes for run lengths.

| Run Length in Blocks | Average Probability | Huffman Code |
|---|---|---|
| 4 | 0.41 | 0 |
| 1 | 0.32 | 01 |
| 2 | 0.17 | 011 |
| 3 | 0.10 | 111 |

TABLE 3

Huffman codes for 3 level quantizer.

| Level Number | Average Probability | Huffman Code |
|---|---|---|
| 2 | 0.60 | 0 |
| 1 | 0.20 | 01 |
| 3 | 0.20 | 011 |

TABLE 4

Huffman codes for 8 level quantizer.

| Level Number | Average Probability | Huffman Code |
|---|---|---|
| 4 | 0.22 | 10 |
| 5 | 0.22 | 01 |
| 3 | 0.19 | 11 |
| 6 | 0.19 | 000 |
| 2 | 0.08 | 1100 |
| 7 | 0.08 | 00100 |
| 1 | 0.01 | 010100 |
| 8 | 0.01 | 110100 |

Implementation of the coding and decoding techniques have been carried out in the C programming language on an Intel computer for a high quality digital graphics image transmission system that utilizes standard telephone communication links. The coding and decoding software are listed in Appendix A and Appendix B respectively.

INDUSTRIAL APPLICABILITY AND ADVANTAGES

The digital image processing method of the present invention is useful in systems for compressing digital images for storage or transmission. The invention has the advantage that compression ratios are substantially improved without substantially adding to the complexity of the hardware for compressing and expanding the image.

I claim:

1. An improved block adaptive predictive coding method of the type wherein a quantizer is selected from a finite set of quantizers to encode a block of error signals based on the statistics of the error signals in the block, wherein the improvement comprises:
   selecting block quantizers based on a plurality of statistical parameters.

2. The method claimed in claim 1, wherein the statistical parameters are a statistical estimate of the range of error signals in a block and a statistical estimate of the centroid of the error signal in the block.

3. The method claimed in claim 2, wherein the estimate of the range is the standard deviation ($\hat{\sigma}$) and the estimate of the centroid is the mean ($\hat{\mu}$).

4. The method claimed in claim 2, wherein the estimate of the range is F(max−min) and the estimate of the centroid is the mode.

5. An improved block adaptive linear predictive coding method for compressing and transmitting or storing a digital image of the type including the steps of: dividing the image into 1×B blocks of pixels; forming a two-dimensional prediction for each pixel value based upon a linear combination of neighboring pixel values; subtracting successive predictions from actual pixel values to form a one-dimensional block of error signals; calculating the sigma ($\hat{\sigma}$) of the error signals in each block; selecting a quantizer for each block from a set of scaled sigma Max quantizers using the calculated sigma; quantizing the error signals in each block with the selected quantizer; transmitting or storing the first line of an image and the first pixel in each line, a code word for the quantizer, and the quantized error signals as the compressed image, wherein the improvement comprises the steps of:
   (a) calculating the mean ($\hat{\mu}$) of the error signals in each block; and
   (b) selecting the quantizer for each block using the calculated sigma and the calculated mean from a set of minimum square error two-variable quantizers based on probability models for a function of the mean ($\hat{\mu}$) and sigma ($\hat{\sigma}$) values.

6. The method claimed in claim 5, wherein the mean ($\hat{\mu}$) and signal ($\hat{\sigma}$) values are employed to select the quantizers, and the probability model for the mean ($\hat{\mu}$) is a Laplacian, and the probability model for sigma ($\hat{\sigma}$) is an exponential.

7. The method claimed in claim 5, further comprising the steps of:
   (a) performing a polar transformation on the mean ($\hat{\mu}$) and sigma ($\hat{\sigma}$) values, where the polar angle is arctan $\hat{\sigma}/\hat{\mu}$ and the polar radius is $\sqrt{\hat{\mu}^2+\hat{\sigma}^2}$; and
   (b) The transformed polar angle and polar radius values are employed to select a set of minimum square error two-variable quantizers based upon a uniform probability model for the polar angle and an exponential probability model for the polar radius.

8. The method claimed in claim 5, 6, or 7, wherein the quantizers have different numbers of quantization levels based on the value of $\hat{\sigma}$, higher values of $\hat{\sigma}$ having more quantization levels.

9. The method claimed in claim 8, further including the step of Huffman encoding the code word for the quantizer and the error signals.

10. An improved block adaptive linear predictive coding method for compressing and transmitting or storing a digital image of the type including the steps of: dividing the image into 1×B blocks of pixels; forming a two-dimensional prediction for each pixel value based upon a linear combination of neighboring pixel values; subtracting successive predictions from actual pixel values for form a one-dimensional block of error signals; calculating the sigma ($\hat{\sigma}$) of the error signals in each block; selecting a quantizer for each block from a set of scaled sigma Max quantizers using the calculated sigma; quantizing the error signals in each block with the selected quantizer; transmitting or storing the first line of an image and the first pixel in each line, a code word for the quantizer and the quantized error signals as the compressed image, wherein the improvement comprises the steps of:
   (a) prior to the step of calculating the sigma value, comparing the average absolute value S of the difference between the input signal values and the average A of their three nearest reconstructed neighbors in a block with the threshold value T, and if S is less than T, treating the block as one in a run of blocks for which no sigma value is calculated, no quantizer is selected and no error signal is transmitted; and
   (b) generating and transmitting a flag indicating a run of blocks and a value indicating the length of the run.

11. The method claimed in claim 10, further including the steps of:
   (a) calculating the mean ($\hat{\mu}$) of the error signals in each block; and
   (b) selecting the quantizer for each block using the calculated sigma and the calculated mean from a set of minimum square error two-variable quantizers based on probability models for a function of the mean ($\hat{\mu}$) and sigma ($\hat{\sigma}$) values.

12. The method claimed in claim 11, wherein the mean ($\hat{\mu}$) and sigma ($\hat{\sigma}$) values are employed to select the quantizers, and the probability model for the mean ($\hat{\mu}$) is a Laplacian and the probability model for sigma ($\hat{\sigma}$) is an exponential.

13. The method claimed in claim 11, further including the steps of:
   (a) performing a polar transformation on the mean ($\hat{\mu}$) and sigma ($\hat{\sigma}$) values, where the polar angle is arctan $\hat{\sigma}/\hat{\mu}$ and the polar radius is $\sqrt{\hat{\mu}^2+\hat{\sigma}^2}$; and
   (b) The transformed polar angle and polar radius values are employed to select from a set of minimum square error two-variable quantizers based upon a uniform probability model for the polar angle and an exponential probability model for the polar radius.

14. The method claimed in claims 10, 11, 12, or 11, further including the steps of Huffman encoding the code word for the quantizer, the error signals, and the run lengths.

15. The method claimed in claims 10, 11, 12, or 11 wherein the quantizers have different numbers of quantization levels based on the value of $\hat{\sigma}$, higher values of $\hat{\sigma}$ having more quantization levels.

16. The method claimed in claim 15, further including the steps of Huffman encoding the code word for the quantizer, the error signals, and the run lengths.

17. An improved block adaptive linear predictive coding method for compressing and transmitting or storing a digital image of the type including the steps of: dividing the image into 1×B blocks of pixels; forming a two-dimensional prediction for each pixel value based upon a linear combination of neighboring pixel values;

subtracting successive predictions from actual pixel values for form a one-dimensional block of error signals; calculating the sigma ($\hat{\sigma}$) of the error signals in each block; selecting a quantizer for each block from a set of scaled sigma Max quantizers using the calculated sigma; quantizing the error signals in each block with the selected quantizer; transmitting or storing the first line of an image and the first pixel in each line, a code word for the quantizer and the quantized error signals as the compressed image, wherein the improvement comprises:

The quantizers having different numbers of quantization levels based on the value of $\hat{\sigma}$, higher values of $\hat{\sigma}$ having more quantization levels.

18. The method claimed in claims 5, 6, 7, or 12, further including the steps of Huffman encoding the code word for the quantizer and the error signals.

* * * * *

UNITED STATES PATENT AND TRADEMARK OFFICE
CERTIFICATE OF CORRECTION

PATENT NO. : 4,885,636

DATED : December 5, 1989

INVENTOR(S) : James R. Sullivan

It is certified that error appears in the above-identified patent and that said Letters Patent is hereby corrected as shown below:

Column 12, line 52, claim 14, "10, 11, 12, or 11" should read
-- 10, 11, 12, or 13 --

Column 12, line 56, claim 15, "10, 11, 12, or 11" should read
--10, 11, 12, or 13--

Signed and Sealed this

Twelfth Day of February, 1991

*Attest:*

HARRY F. MANBECK, JR.

*Attesting Officer*    *Commissioner of Patents and Trademarks*